(12) United States Patent
Wen-Pin

(10) Patent No.: US 7,003,852 B2
(45) Date of Patent: Feb. 28, 2006

(54) ADJUSTABLE STEPLESS HINGE SHAFT

(76) Inventor: Chuang Wen-Pin, No. 114-5, Dernlin Road, Wuuku Hsiang, Taipei Hsien (TW)

(*) Notice: Subject to any disclaimer, the term of this patent is extended or adjusted under 35 U.S.C. 154(b) by 31 days.

(21) Appl. No.: 10/695,510

(22) Filed: Oct. 25, 2003

(65) Prior Publication Data

US 2005/0086767 A1    Apr. 28, 2005

(51) Int. Cl.
*E05D 11/08* (2006.01)
(52) U.S. Cl. .......................................... 16/342; 361/683
(58) Field of Classification Search .......... 16/338–342, 16/381, 382, 356, 272, 244, 239, 235, DIG. 43; 403/78, 79, 325–327, 118–120; 379/428–434; 361/680–683, 801–804; 411/44, 55, 63; 455/90, 550, 556, 575
See application file for complete search history.

(56) References Cited

U.S. PATENT DOCUMENTS

| | | | | |
|---|---|---|---|---|
| 2,862,229 A | * | 12/1958 | Bacca ......................... | 16/342 |
| 4,718,127 A | * | 1/1988 | Rittmann et al. ............... | 2/424 |
| 4,951,350 A | * | 8/1990 | Nunes ......................... | 16/263 |
| 5,333,356 A | * | 8/1994 | Katagiri ...................... | 16/340 |
| 5,566,048 A | * | 10/1996 | Esterberg et al. ............. | 361/681 |
| 5,715,576 A | * | 2/1998 | Liu ............................. | 16/342 |
| 5,774,939 A | * | 7/1998 | Lu ............................... | 16/342 |
| 5,832,566 A | * | 11/1998 | Quek et al. .................... | 16/342 |
| 5,894,635 A | * | 4/1999 | Lu ............................... | 16/342 |
| 5,950,281 A | * | 9/1999 | Lu ............................... | 16/342 |
| 6,101,676 A | * | 8/2000 | Wahl et al. .................... | 16/342 |
| 6,256,836 B1 | * | 7/2001 | Lin et al. ...................... | 16/263 |
| 6,381,808 B1 | * | 5/2002 | Kida ............................ | 16/340 |
| 6,490,757 B1 | * | 12/2002 | Landis et al. ................. | 16/324 |
| 6,609,273 B1 | * | 8/2003 | Yamada et al. ................ | 16/332 |
| 6,813,812 B1 | * | 11/2004 | Lu et al. ....................... | 16/342 |
| 2002/0042971 A1 | * | 4/2002 | Liao ............................ | 16/342 |
| 2003/0000046 A1 | * | 1/2003 | Liao ............................ | 16/307 |

* cited by examiner

*Primary Examiner*—Robert J. Sandy
*Assistant Examiner*—Andre' L. Jackson

(57) ABSTRACT

An adjustable stepless hinge shaft comprised of a male shaft tube, a female shaft tube, and an adjustment rod. The male shaft tube contains a tubular hinge shaft having a mounting section at one extremity; the tubular hinge shaft includes a flange, a tapered hole section at its interior portion, a threaded hole section in its exterior portion, and one or more lengthwise channel on it. The female shaft tube consists of a tubular sleeve and a mounting section; the tubular sleeve includes a columnar bore inside and an annular groove near the entrance of the columnar bore. The adjustment rod consists of a tapered rod and a threaded stud at one extremity. The male shaft tube tubular hinge shaft is inserted into the female shaft tube tubular sleeve and the adjustment rod is then inserted into the male shaft tube tubular hinge shaft or the adjustment rod is first inserted into the male shaft tube tubular hinge shaft and then the tubular hinge shaft is inserted into the female shaft tube tubular sleeve, thereby completing assembly. The overall structure is simple and has few structural components. Furthermore, production and installation is simple and fast, while opening and closing operation is smooth, stable, and durable.

4 Claims, 3 Drawing Sheets

ADJUSTABLE STEPLESS HINGE SHAFT

BACKGROUND OF THE INVENTION

1) Field of the Invention

The invention herein relates to hinge mechanisms for notebook computers and other similar products, specifically an adjustable stepless hinge shaft that provides for a simple structure as well as rapid assembly and installation between the top cover and bottom base of notebook computers, with a smooth, stable, and durable action during the opening and closing operation. At the same time, the torque resistance is adjustable to a set value to prevent loosening, flexing, and dislodging.

2) Description of the Prior Art

Notebook computer products are small and light to facilitate portable usage. To achieve a thin, compact, and lightweight design, they consist of two integrated sections: a system and keyboard situated in a bottom base along with a display and an overlaying member disposed in a top cover. When such notebook computers are not utilized or usage is finished, the top cover is folded over the bottom base. When utilized, the top cover is opened upward more than 90 degrees at minimum to an appropriate inclination to permit viewing the display in the top cover during operation and usage. As a result, stepless hinge shafts or hinges must be installed between the said top cover and bottom base. However, some of the stepless hinge shafts or hinges utilized by notebook computer manufacturers are too simple and crude (for example, Taiwan Patent Bulletin No. 175877, 237160, and 357905), not sufficiently strong, and have a rather short service life. Others are overly complex and, furthermore, having inappropriate structural designs (such as Taiwan Patent Bulletin No. 264062, 282114, 307391, 375293, 397321, and 390449). When installed for utilization, achieving proper torque is difficult or flexing or positioning is inconsistent after repeated opening and closing. Some hinge shafts and hinges become noisy or rough during their opening and closing operation on notebook computers. At the same time, since the said hinge shafts and hinges typically have "fixed" designs, no adjustment is possible when loosening or flexing occurs and the hinge shafts and hinges must be replaced. For notebook computer users, opening and closing the top covers of notebook computers often leads to great inconvenience and problems, and many will not purchase or use a high-end notebook computer for this reason.

SUMMARY OF THE INVENTION

The objective of the invention herein is to provide an adjustable stepless hinge shaft comprised of a male shaft tube, a female shaft tube, and an adjustment rod. The said male shaft tube consists of a tubular hinge shaft having a mounting section at one extremity; the said tubular hinge shaft includes a flange formed along its surface, a tapered hole section at its interior portion, a threaded hole section in its exterior portion, and one or more lengthwise channel on it. The said female shaft tube consists of a tubular sleeve and a mounting section; the said tubular sleeve includes a columnar bore inside and an annular groove near the entrance of the said columnar bore. The said adjustment rod consists of a tapered rod and a threaded stud at one extremity; the said adjustment rod includes a round projecting edge at the proximal end of the said threaded stud or a hexagonal, square, pentagonal socket in the center of its end surface; or a hexagonal, square, pentagonal socket in the center of its end surface socket at the proximal end of its tapered rod or rod; the said adjustment rod rod member includes a columnar passage and a slot penetrating the entire supportive rod component; the columnar bore in the said female shaft tube tubular sleeve includes a through-hole that penetrates the bottom portion of the said columnar bore; additionally, the round projecting edge of the said adjustment rod includes a hexagonal, square, or two-sided parallel circular end; its tapered rod includes a two-sided parallel circular end; the male shaft tube tubular hinge shaft is inserted into the female shaft tube tubular sleeve and the adjustment rod is then inserted into the male shaft tube tubular hinge shaft, or the adjustment rod is first inserted into the male shaft tube tubular hinge shaft and then the tubular hinge shaft is inserted into the female shaft tube tubular sleeve, thereby completing the assembly of the adjustable stepless hinge shaft herein for notebook computers and other similar products; the present invention has few structural components, the overall structure is simple and, furthermore, production and installation is simple and fast, while opening and closing operation as installed between the top cover and the bottom base of a notebook computer is smooth, stable, and durable; at the same time, the torque resistance is adjustable to a set value to prevent loosening, flexing, and dislodging.

DETAILED DESCRIPTION OF THE INVENTION

Figure 1:
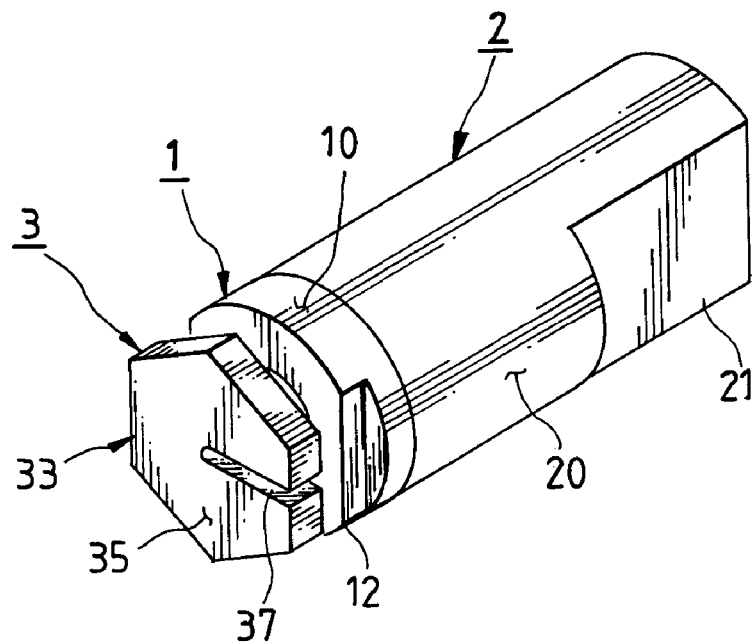
FIG. 1 is an isometric drawing of the invention herein.
Figure 4:
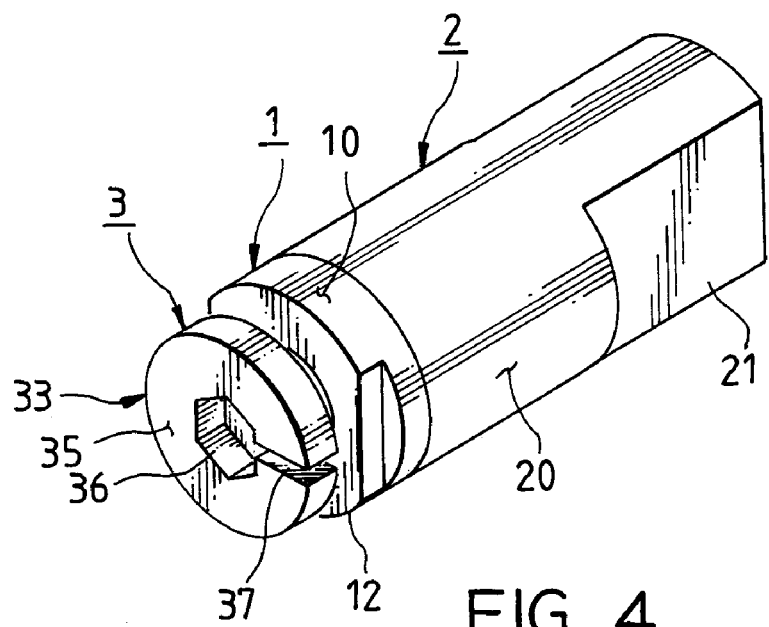
FIG. 4 is an isometric drawing of another embodiment of the invention herein.
Figure 2:
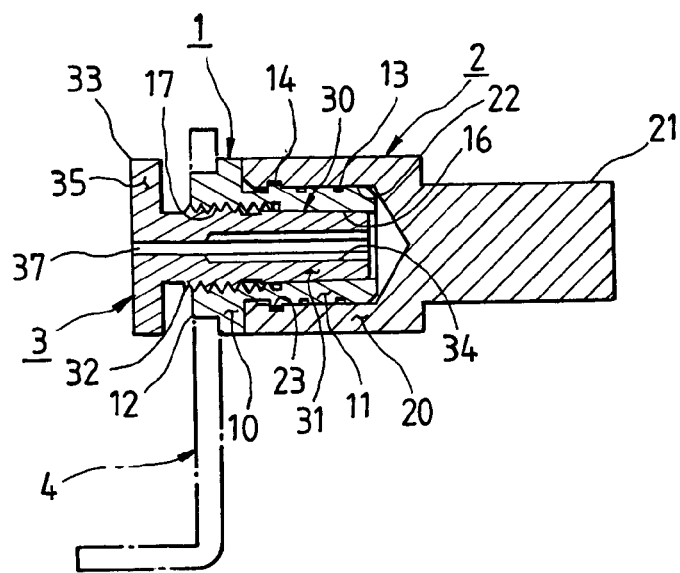
FIG. 2 is a cross-sectional drawing of the invention herein.
Figure 3:
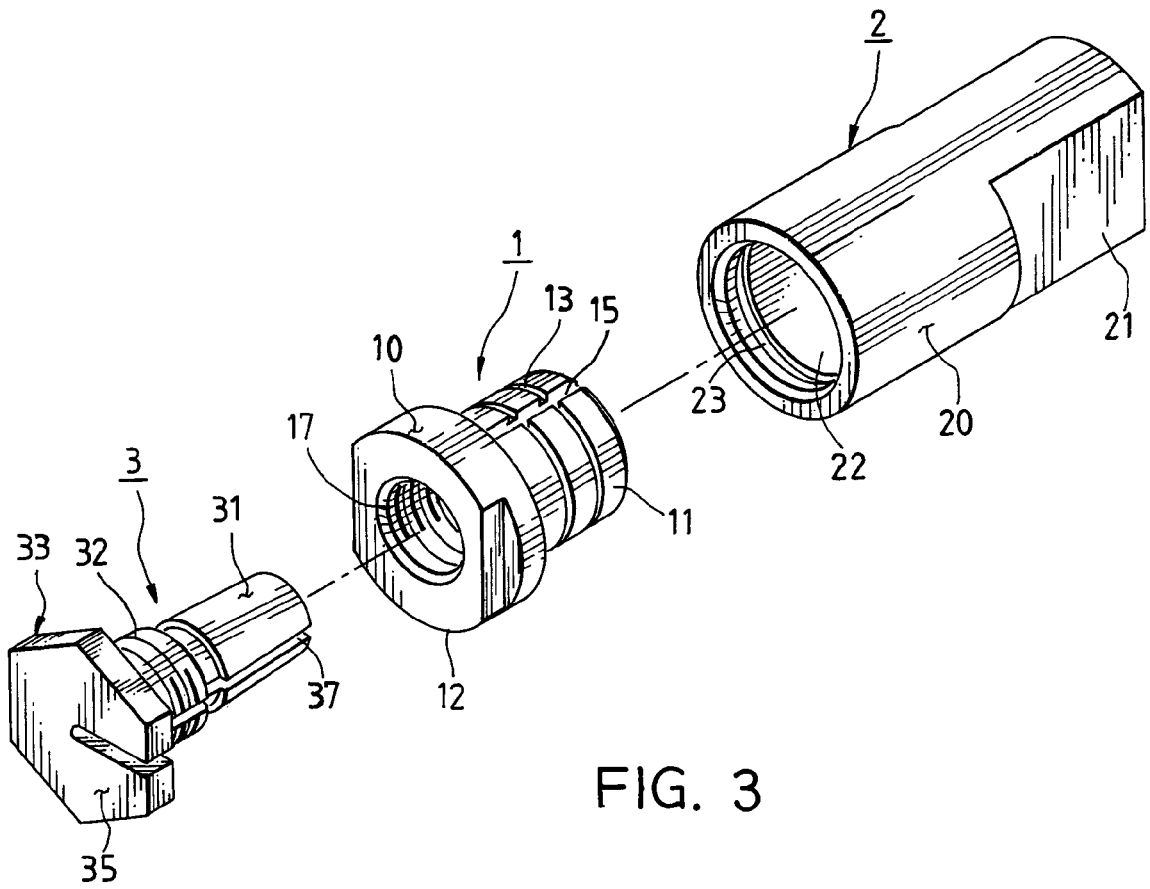
FIG. 3 is an exploded drawing of the invention herein.

Referring to FIG. 1, FIG. 2, and FIG. 3, the adjustable stepless hinge shaft of the invention herein is comprised of a male shaft tube 1, a female shaft tube 2, and an adjustment rod 3; wherein, the said male shaft tube 1 is constructed of carbon steel or higher grade tubular stock that is carburized or heat treated after machining into shape; a tubular hinge shaft 11 is machined at one extremity of a rod member 10, with a parallel sided raised area 12, two or more planar recesses, or a threaded rod and its matching mounting section machined at the opposite extremity; a plurality of annular oil grooves 13 and a flange 14 are formed along the surface of the said tubular hinge shaft 11 as well as a minimum of one lengthwise channel 15 (as shown in FIG. 2) such that the said tubular hinge shaft 11 is a barrel-like entity capable of lengthening and shortening; the said tubular hinge shaft 11 has a tapered hole section 16 (as shown in FIG. 2) machined on one extremity and a threaded hole section 17 machined on its opposite extremity that enables the screw fastening of the said adjustment rod 3. The said female shaft tube 2 is constructed of iron or medium-grade or higher carbon steel tubular stock that is carburized or heat treated after machining into shape, and consists of a tubular sleeve 20 that has facets 21 milled at one extremity, two or more planar recesses, or a threaded rod and its matching mounting section; a columnar bore 22 is formed in the said tubular sleeve 20 that accommodates the male shaft tube 1 tubular hinge shaft 11 and, furthermore, an annular groove 23 is machined near the entrance of the said columnar bore 22 such that when the said male shaft tube 1 is insertionally unioned, the flange 14 on the said male shaft tube 1 tubular hinge shaft 11 fits into the said annular groove 23, preventing separation and dislodging. The said adjustment rod 3 is constructed of iron or medium-grade or higher carbon steel tubular stock that is carburized or heat treated after machining into shape; and is a rod member 30 consisting of a tapered rod 31 having a threaded stud 32 at one end and a round projecting edge 33 at the proximal end of the said threaded stud 32, the said round projecting edge 33 shaped into a hexagonal or a square head 35, a plain circular body, one laving a hexagonal socket 36 in the center, as indicated in FIG. 4, or a square or pentagonal circular head 35'; a columnar passage 34 (as indicated in FIG. 2) is disposed in the tapered rod 31 on the said adjustment rod member 30 and a slot 27 is articulated along the entire supportive rod component, enabling the said rod member 30 to become a component capable of lengthening and shortening to facilitate tight fastening and insertion into the male shaft tube 1 tubular hinge shaft 11.

Referring to FIG. 2 and FIG. 3, when the adjustable stepless hinge shaft of the invention herein is assembled, the male shaft tube 1 tubular hinge shaft 11 is first inserted into the female shaft tube 2 tubular sleeve 20 and then the rod member 30 tapered rod 31 and threaded stud 32 are fastened into the male shaft tube 1 tubular hinge shaft 11, thereby completing the assembly of the invention herein for usage on a notebook computer or other similar product. The installation and assembly task is simple and fast; after assembly, only a wrench is needed for turning the said adjustment rod 3 to an appropriate degree of tightness such that the lengthened elastic stress of the said male shaft tube 1 tubular hinge shaft 11 is subjected to the leveraged elastic stress of the said rod member 30 tapered rod 31 and tightened against the said female shaft tube 2 tubular sleeve 20, enabling a certain amount of torque to be produced when the said male shaft tube 1 and female shaft tube 2 are rotated to overcome looseness or flexing; since the plurality of annular oil grooves 13 are formed along the surface of the said male shaft tube 1 tubular hinge shaft 11, during the said assembly and installation task, grease or lubricating oil is applied onto the surface of the tubular hinge shaft 11 prior to the assembly and installation task such that there is smoothness, stability, and durability when the said male shaft tube 1 and female shaft tube 2 are rotated; at the same time, since the flange 14 and the annular groove 23 are disposed on the said tubular hinge shaft 11 and the tubular sleeve 20, separation and dislodging cannot occur after their fitted conjoinment. As such, when the raised area 12 or equivalent mounting section and the facets 21 on the female shaft tube 2 or equivalent of the said adjustable stepless hinge shaft are respectively installed and conjoined to the top cover and the bottom base of a notebook computer or other similar product; or, when a mounting tab 4 (as depicted by the invisible line in FIG. 2) on the male shaft tube 1 or other equivalent mounting fixture are respectively installed and conjoined to the top cover and the bottom base of a notebook computer or other similar product; the said top cover during operation opens and closes smoothly, stably, and durably, with the torque adjustably maintained at a set value such that loosening, flexing and dislodging do not easily occur.

Figure 5:
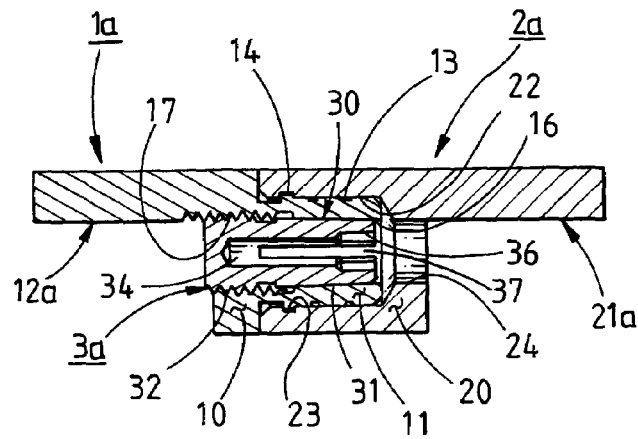
FIG. 5 is a cross-sectional drawing of yet another embodiment of the invention herein.
Figure 6:
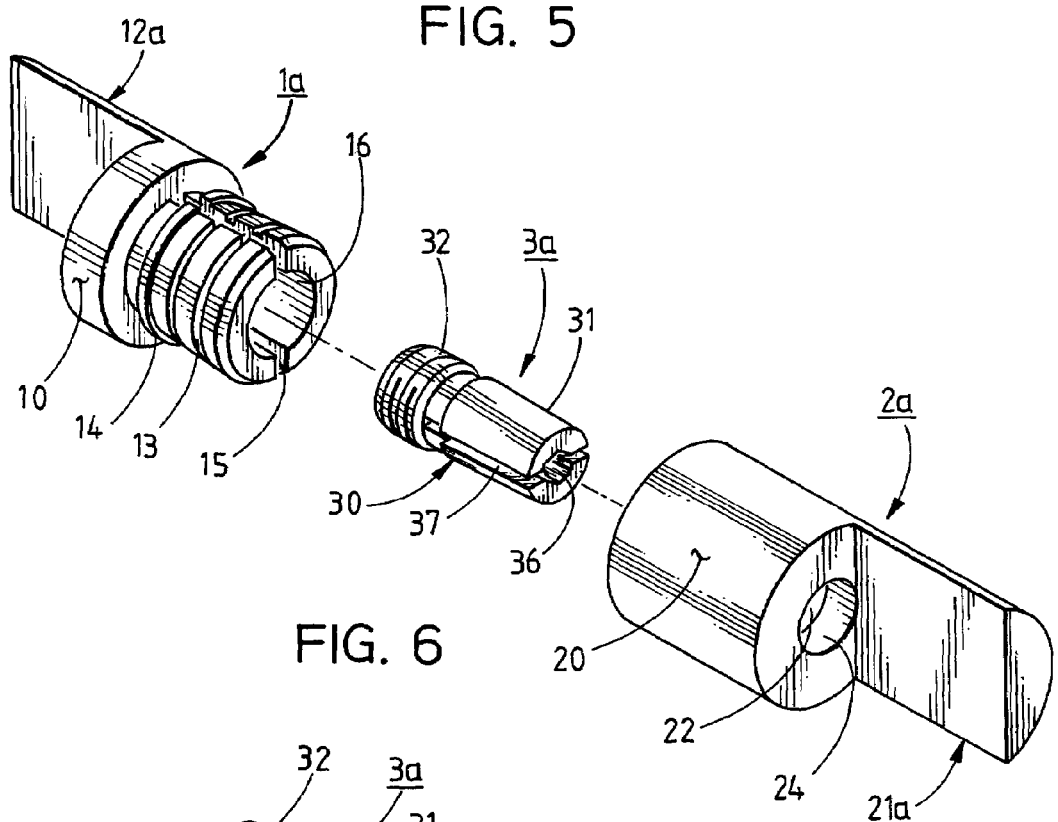
FIG. 6 is an exploded drawing of the embodiment in FIG. 5.
Figure 7:
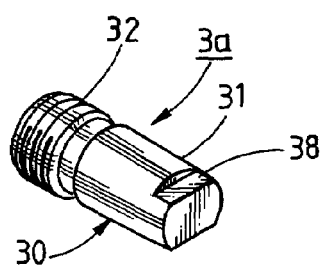
FIG. 7 is an isometric drawing of the adjustment rod in the other embodiment.

Referring to FIG. 5 and FIG. 6, another most preferred embodiment of the adjustable stepless hinge shaft of the invention herein is comprised of a male shaft tube 1a, a female shaft tube 2a, and an adjustment rod 3a. The material and fabrication approach utilized of each structural component is identical to that of the previous embodiment and thus requires no additional elaboration, with the only variation being a portion of the structure, threads, sleeve coupling, and the adjustment rod 3a. Wherein, the outer end diameter of the tapered tubular aspect along the said male shaft tube 1a tubular hinge shaft 11 is a larger and laterally offset D-shaped plate 12a that serves as a mounting section machined at the opposite extremity of the said tubular hinge shaft 11, facilitating the tapping of a threaded hole section 17 (as shown in FIG. 5) and, furthermore, a straight hole section 16a is situated instead at the opposite end of the threaded hole section 17 in the said tubular hinge shaft 11. The said female shaft tube 2a has a laterally offset D-shaped plate 12a that serves as a mounting section machined at one extremity of its tubular sleeve 20; and a through-hole 24 is formed at the bottom portion of its columnar bore 22 to provide for the fastening and sleeve coupling of the adjustment rod 3a. Additionally, the adjustment rod 3a does not consist of rod member (30) having a round projecting edge (33) at the proximal end of its threaded stud 32, but is modified into a rod member (30) with a hexagonal socket 36, a square or pentagonal socket in the end surface of its tapered rod 31; or, modified such that a two-sided parallel end 38 (as shown in FIG. 7) is machined on the proximal end of the said tapered rod 31 to enable fastening, sleeve coupling, and adjustment by a tool.

When the other embodiment of the adjustable stepless hinge shaft of the invention herein shown in FIG. 5 is assembled, the adjustment rod 3a is first fastened and sleeve coupled to the straight hole section 16a and the threaded hole section 17 in the male shaft tube 1a tubular hinge shaft 11 and the said male shaft tube 1a tubular hinge shaft 11 along with the said adjustment rod 3a is then inserted into the female shaft tube 2a tubular sleeve 20, which completes the assembly of the other adjustable stepless hinge shaft embodiment of the invention herein for utilization on a notebook computer or other similar product. Since a through-hole 24 is formed at the bottom portion of the columnar bore 22 in the female shaft tube 2a tubular sleeve 20, the adjustment rod 3a can be fastened and sleeve coupled into either end of the said tubular sleeve 20; in this embodiment, although (male) shaft tube 1a tubular hinge shaft 11 outer diameter is larger than the outer end diameter of its tapered tubular aspect, since the lengthwise channel 15 permits shortening, during insertion into the columnar bore 22 of the female shaft tube 2a tubular sleeve 20, it can be shortened to match the tubular sleeve (20) and tightly inserted into the said bore 22; at the same time, the straight hole section 16a hole section becomes smaller towards the tapered hole section at the outer end diameter to accommodate the fastening and sleeve coupling of the adjustment rod 3a tapered rod 31 such that the installation and assembly task is easy and fast; after completion of installation and assembly, a wrench is extended into the through-hole 24 at the bottom portion of the female shaft tube 2a tubular sleeve 20 columnar bore 22 to turn the hexagonal socket 36 or the two-sided parallel end 38 at the distal extremity of the said adjustment rod 3a tapered rod 31 and thereby adjust looseness or tightness.

The invention claimed is:
1. An adjustable stepless hinge shaft comprising:
a male shaft tube comprising:
 a rod member;
 a tubular hinge shaft disposed at one extremity of said rod member;
 a mounting section disposed at the opposite extremity of said rod member;
a female shaft tube comprising:
 a tubular sleeve conjoined to said tubular hinge shaft;
 a mounting section at one extremity of said tubular sleeve;
 an adjustment rod that is fastened and sleeve coupled into said male shaft tube tubular hinge shaft; the features of which are:
said male shaft tube further includes:
 a flange formed along the surface of said tubular hinge shaft;
 a tapered hole section at one extremity of said tubular hinge shaft;
 a threaded hole section at the opposite extremity of said tubular hinge shaft;
 one or more lengthwise channel on said tubular hinge shaft;
said female shaft tube further includes:
 a columnar bore in said tubular sleeve;
 an annular groove near the entrance of said columnar bore;
said adjustment rod further includes:
 a tapered rod;
 a threaded stud at one extremity of said tapered rod;
 a round projecting edge at the proximal end of said threaded stud;
 a columnar passage in said tapered rod;
 a slot through said tapered rod, said threaded stud and said round projecting edge.

2. The adjustable stepless hinge shaft of claim 1, wherein said round projecting edge on said adjustment rod includes a two-sided parallel, square, or polygonal head; or a circular head having in the end surface of its circular head a hexagonal, square or pentagonal socket.

3. The adjustable stepless hinge shaft of claim 1, the present invention further includes:
 said male shaft tube tubular hinge shaft having a tapered tubular aspect at its outer end that is of a larger diameter;
 said female shaft tube tubular sleeve having a through-hole formed at the bottom portion of said columnar bore;
 said adjustment rod having a hexagonal, pentagonal, or square socket or two-sided parallel head disposed at the proximal end of its tapered rod.

4. The adjustable stepless hinge shaft of claim 1 or claim 3, wherein, a plurality of annular oil grooves are formed along the surface of said male shaft tube tubular hinge shaft.

* * * * *